US008270822B2

(12) United States Patent
Sasaki et al.

(10) Patent No.: US 8,270,822 B2
(45) Date of Patent: Sep. 18, 2012

(54) AIRCRAFT USE WATER HEATER

(75) Inventors: Shuichi Sasaki, Tokyo (JP); Seiichi Tomiyama, Tokyo (JP)

(73) Assignee: Jamco Corporation, Tokyo (JP)

( * ) Notice: Subject to any disclaimer, the term of this patent is extended or adjusted under 35 U.S.C. 154(b) by 513 days.

(21) Appl. No.: 12/633,356

(22) Filed: Dec. 8, 2009

(65) Prior Publication Data

US 2010/0150535 A1 Jun. 17, 2010

(30) Foreign Application Priority Data

Dec. 11, 2008 (JP) ................................ 2008-315946

(51) Int. Cl.
*A47J 27/00* (2006.01)
*E04H 4/00* (2006.01)
*A01K 7/00* (2006.01)

(52) U.S. Cl. ............................... 392/441; 4/493; 119/73

(58) Field of Classification Search .................. 392/441, 392/308–406; 4/493; 119/73
See application file for complete search history.

(56) References Cited

U.S. PATENT DOCUMENTS 2,322,502 A * 6/1943 Beckstrom ..................... 165/86
3,868,991 A * 3/1975 Sheppard ..................... 165/283
4,173,872 A * 11/1979 Amthor, Jr. ................. 62/238.6
5,179,914 A * 1/1993 Moore et al. ................ 122/19.2
6,988,389 B2 * 1/2006 Hawkes ......................... 72/262
2005/0268682 A1 * 12/2005 Hawkes ......................... 72/262
2010/0150535 A1 * 6/2010 Sasaki et al. ................. 392/441

FOREIGN PATENT DOCUMENTS

JP 2002-046696 A 2/2002

* cited by examiner

*Primary Examiner* — Daniel L Robinson

(74) *Attorney, Agent, or Firm* — Westman, Hattori, Daniels & Adrian, LLP

(57) ABSTRACT

To provide an aircraft use water heater that operates by an aircraft power source of an AC variable frequency mounted in an aircraft, that is small, light-weight, safe, and low power consumption, and that can supply warm water stably. In an aircraft use water heater composed of a tank section for heating liquid stored therein and a controlling section for controlling the heating of the liquid by an aircraft power source, a bottom face of the tank section has a baffle plate and, liquid flowing in the tank section collides against the baffle plate to flow in a different direction parallel to the bottom face and is upwardly moved, while being heated, in the vicinity of a helical coil-type heater and is taken out through a liquid outlet.

6 Claims, 15 Drawing Sheets

FIG.13

| APPARATUS PERFORMANCE | CONVENTIONAL EXAMPLE | PRESENT INVENTION |
|---|---|---|
| DRY WEIGHT | 1.81kg | 1.18kg |
| OUTER DIAMETER | 102 mm | 90 mm |
| HEIGHT | 305 mm | 244 mm |
| TANK CAPACITY | 1.35 L | 0.56 L |
| POWER SUPPLY | AC115V 400Hz | AC115V 360-800Hz |
| POWER CONSUMPTION | 420W | 700W |
| CURRENT CONSUMPTION | 3.61A | 6.1A |
| SET HOT WATER TEMPERATURE | 52°C, 46°C, 41°C | 48°C |
| INITIAL BOILING TIME | 9 min. | 2 min 15 sec |
| CONTINUOUS HOT WATER DISCHARGE TIME | 40 sec. | 15 sec. |
| RECOVERY TIME | 1 min. 50 sec. | 1 min. |

SUPPLY CHARACTERISTIC OF HEATED WATER SUPPLIED 5 TIMES FOR 15 SECONDS WITH INTERVAL OF 60 SECONDS

| | FIRST | SECOND | THIRD | FOURTH | FIFTH |
|---|---|---|---|---|---|
| PRESENT INVENTION | 46°C | 45°C | 44°C | 40°C | 37°C |
| CONVENTIONAL EXAMPLE | 48°C | 51°C | 51°C | 51°C | 49°C |

AIRCRAFT USE WATER HEATER

The present application is based on and claims priority of Japanese patent application No. 2008-315946 filed on Dec. 11, 2008, the entire contents of which are hereby incorporated by reference.

BACKGROUND OF THE INVENTION

1. Field of the Invention

The present invention relates to an aircraft use water heater that operates by an aircraft power source of an AC variable frequency provided in an aircraft, that is small, light-weight, safe, and low power consumption, and that can provide an efficient heating.

2. Description of the Related Art

Conventionally, a small and light-weight water heater has been developed as an aircraft use water heater. When compared with the conventional product, an aircraft use water heater mounted in a new-type aircraft having a fuselage composed of carbon fiber material must be further smaller, light-weight, safer, and lower power consumption.

FIG. 15 illustrates a schematic structure of an aircraft use water heater of a conventional example. As shown in FIG. 15, cold water flowing from the lower part of a water heater is upwardly moved and heated along the periphery of a plurality of heaters provided in a tank section to thereby provide hot water through an opening at the upper part of the tank section. An aircraft water heater is also disclosed in the following Patent Document.

[Patent Document 1] Japanese Unexamined Patent Application No. 2002-46696

SUMMARY OF THE INVENTION

In the case of the conventional aircraft use water heater however, the weight was heavy and also the outer size was large and the capacitance was small, thus requiring a time for heating water until a set temperature value is reached. Furthermore, as described above, since the cold water flowing from the lower part of the water heater is upwardly moved and heated along the periphery of a plurality of heaters provided in the tank section, hot water heated by the heaters in the tank is directly mixed with the cold water entering the interior of the tank to thereby cause a declined water temperature, thus causing a disadvantage where repeated use of the water heater causes cold water to be discharged through a faucet.

It is an objective of the present invention to provide an aircraft use water heater that operates by an aircraft power source of an AC variable frequency mounted in an aircraft, that is small, light-weight, safe, and low power consumption, and that can supply warm water stably.

The aircraft use water heater of the present invention is characterized in comprising a tank section for heating liquid stored therein and a controlling section for controlling the heating of the liquid by an aircraft power source. The aircraft use water heater includes: an inflow inlet formed in a bottom face of the tank section through which the liquid flows into the tank section; a baffle plate that is provided at an upper part of the inflow inlet and that prevents the liquid from moving in a straight manner; a helical coil-type heater in the tank section, the helical coil-type heater has a helical axis provided in a direction parallel to the bottom face of the tank section; and a liquid outlet formed in an upper part of a wall face of the tank section. Liquid flowing from the inflow inlet to the tank section collides against the baffle plate to flow in a different direction parallel to the bottom face of the tank section and moves to the lower part of the helical coil-type heater and then is moved upwardly, while being heated, in the vicinity of a helical coil section of the helical coil-type heater and the heated liquid is caused to flow through the liquid outlet.

The aircraft use water heater of the present invention is also characterized in that the baffle plate is provided in a direction dislocated by a predetermined angle from a direction along which the baffle plate is orthogonal to a helical axis of the helical coil-type heater, liquid flowing from the baffle plate in a direction parallel to the bottom face collides against a helical coil section at a lower part of the helical coil-type heater to flow in a different direction and is moved upwardly, while being heated, in the vicinity of the helical coil section.

The aircraft use water heater of the present invention is further characterized in that the bottom face of the controlling section has an aircraft power source connector and a liquid inlet, the aircraft power source connector is connected to a power source control substrate in the controlling section, the liquid inlet of the bottom face of the controlling section is connected to the inflow inlet of the bottom face of the tank section via an inner pipe penetrating an interior of the controlling section. A radiating control element connected to the power source control substrate of the controlling section is provided at a back face of the bottom face of the tank section, and heat generated from the radiating control element is used to heat the liquid via the bottom face of the tank section. A pressure sensor, a thermistor sensor, and a temperature fuse as a safety apparatus are provided in the tank section and are connected to the power source control substrate in the controlling section via a connecting section provided at a back face of the bottom face of the tank section. Alternatively, a side face of the tank section has, as a safety apparatus, a release valve, a thermostat, and a light-emitting diode indicator indicating ON or OFF of a power source.

According to the present invention, the baffle plate prevents the warm water heated by the heater in the tank from being mixed with cold water entering the tank and water is gradually moved upward from the lower part of the tank. Thus, an increased amount of warm water can be supplied for a fixed time and at a fixed temperature.

Also according to the present invention, a part of components is attached to the tank bottom face and the control substrate is integrated to the controlling section at the lower part of the tank. Thus, a smaller size can be achieved. Furthermore, when compared with the conventional product, the tank can have a smaller size and a higher capacitance, thus achieving a ¼-reduced boiling time.

BRIEF DESCRIPTION OF THE DRAWINGS

FIG. 13 is a table of performances and characteristics for the aircraft use water heater of the illustrative embodiment of the present invention.

DESCRIPTION OF THE PREFERRED EMBODIMENTS

The following section will describe an embodiment of the present invention with reference to the drawings.

Illustrative Embodiment

Figure 1:
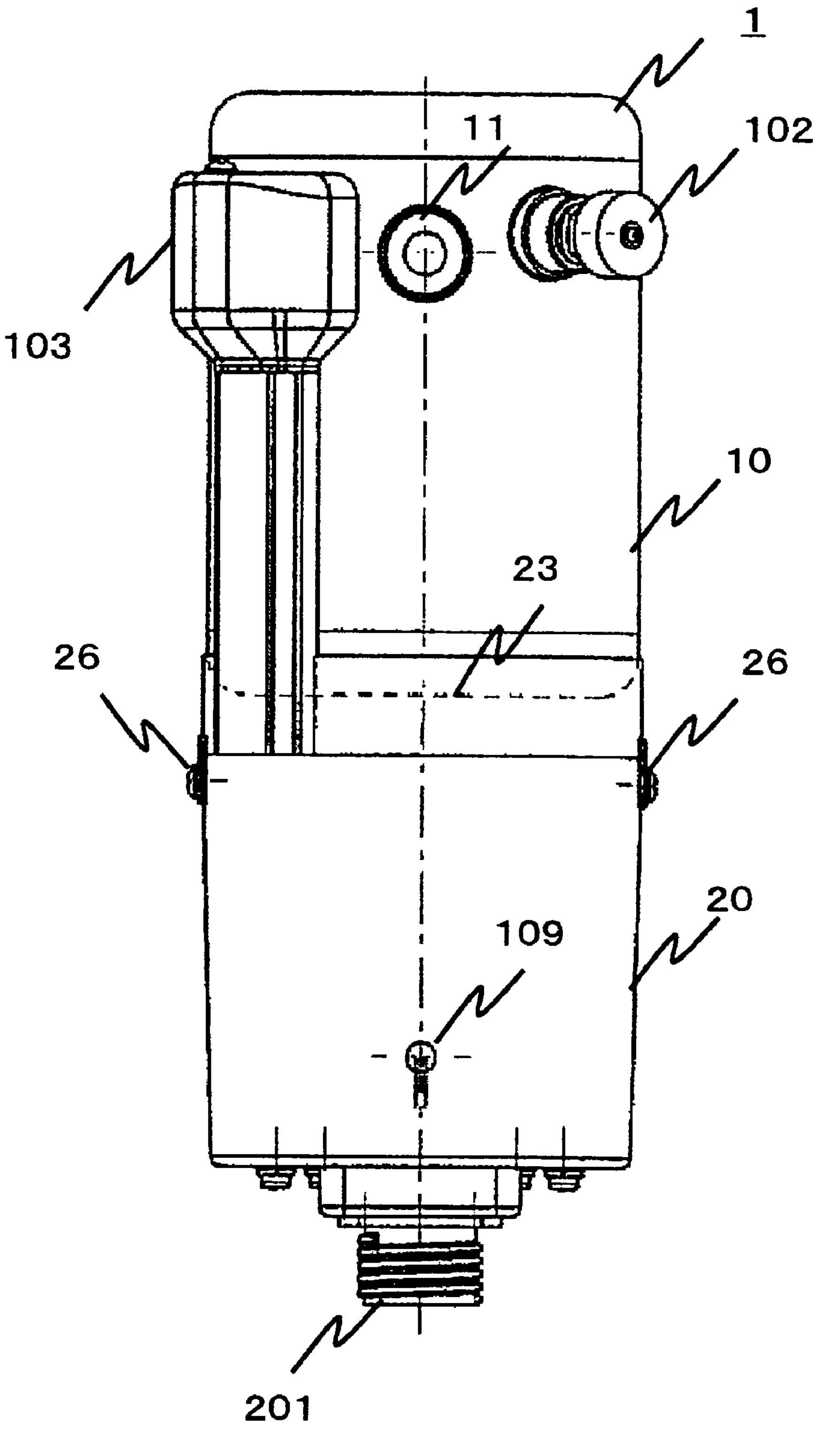
FIG. 1 is a front view illustrating the aircraft use water heater of the illustrative embodiment of the present invention.

FIG. 1 is a front view illustrating an aircraft use water heater of an illustrative embodiment of the present invention. In FIG. 1, the reference numeral 1 denotes a water heater, the reference numeral 10 denotes a tank section, the reference numeral 11 denotes a water outlet, the reference numeral 20 denotes a controlling section, the reference numeral 23 denotes a tank bottom face, the reference numeral 26 denotes a connecting section, the reference numeral 102 denotes a release valve, the reference numeral 103 denotes a thermostat, the reference numeral 109 denotes a light-emitting diode indicator, and the reference numeral 201 denotes a power source connector.

The water heater 1 is composed of the tank section 10 and the controlling section 20. The tank section 10 is connected to the controlling section 20 via the connecting section 26. The tank section 10 includes the water outlet 11, the release valve 102, and the thermostat 103. Water to be heated is stored at the upper part of the tank bottom face 23 and heated warm water is taken out through the water outlet 11.

The release valve 102 is released when the pressure in the tank increases. The thermostat 103 is a safety apparatus that detects an increase in the temperature of the apparatus to stop heating.

The controlling section 20 controls the heating of the water stored in the tank section 10. The lower part of the controlling section 20 has the power source connector 201 that is connected to an aircraft power source of AC variable frequencies from 360 Hz to 800 Hz. A side wall of the controlling section 20 has the light-emitting diode indicator 109 that indicates the ON or OFF of the power source.

Figure 2:
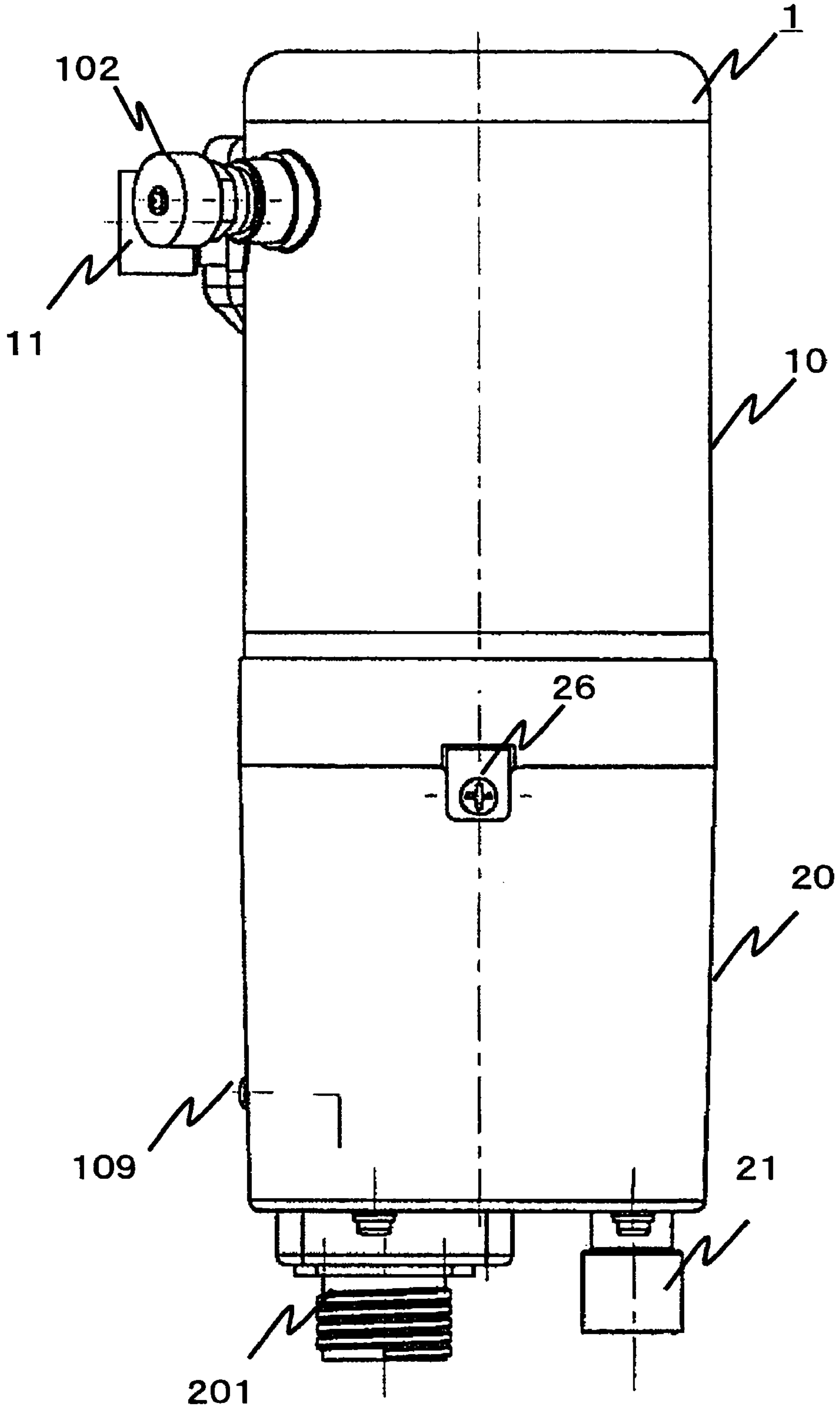
FIG. 2 is a side view illustrating the aircraft use water heater of the illustrative embodiment of the present invention.

FIG. 2 is a side view illustrating the aircraft use water heater of an illustrative embodiment of the present invention. In FIG. 2, the reference numeral 1 denotes a water heater, the reference numeral 10 denotes a tank section, the reference numeral 11 denotes a water outlet, the reference numeral 20 denotes a controlling section, the reference numeral 21 denotes a water inlet, the reference numeral 26 denotes a connecting section, the reference numeral 102 denotes a release valve, the reference numeral 109 denotes a light-emitting diode indicator, and the reference numeral 201 denotes a power source connector.

The water inlet 21 provided at the lower part of the controlling section 20 of the water heater 1 and the water outlet 11 provided at the upper part of the side wall of the tank section 10 are connected to a piping and the power source connector 201 is connected to a power source. The water inlet 21 receives water supplied from the fuselage and the power source connector 201 receives single-phase AC (nominal AC115V, 360 Hz to 800 Hz). When the power source is turned ON, the light-emitting diode indicator 109 is lit to indicate that the power source is ON and heated warm water is taken out through the water outlet 11 of the tank section 10.

Figure 3:
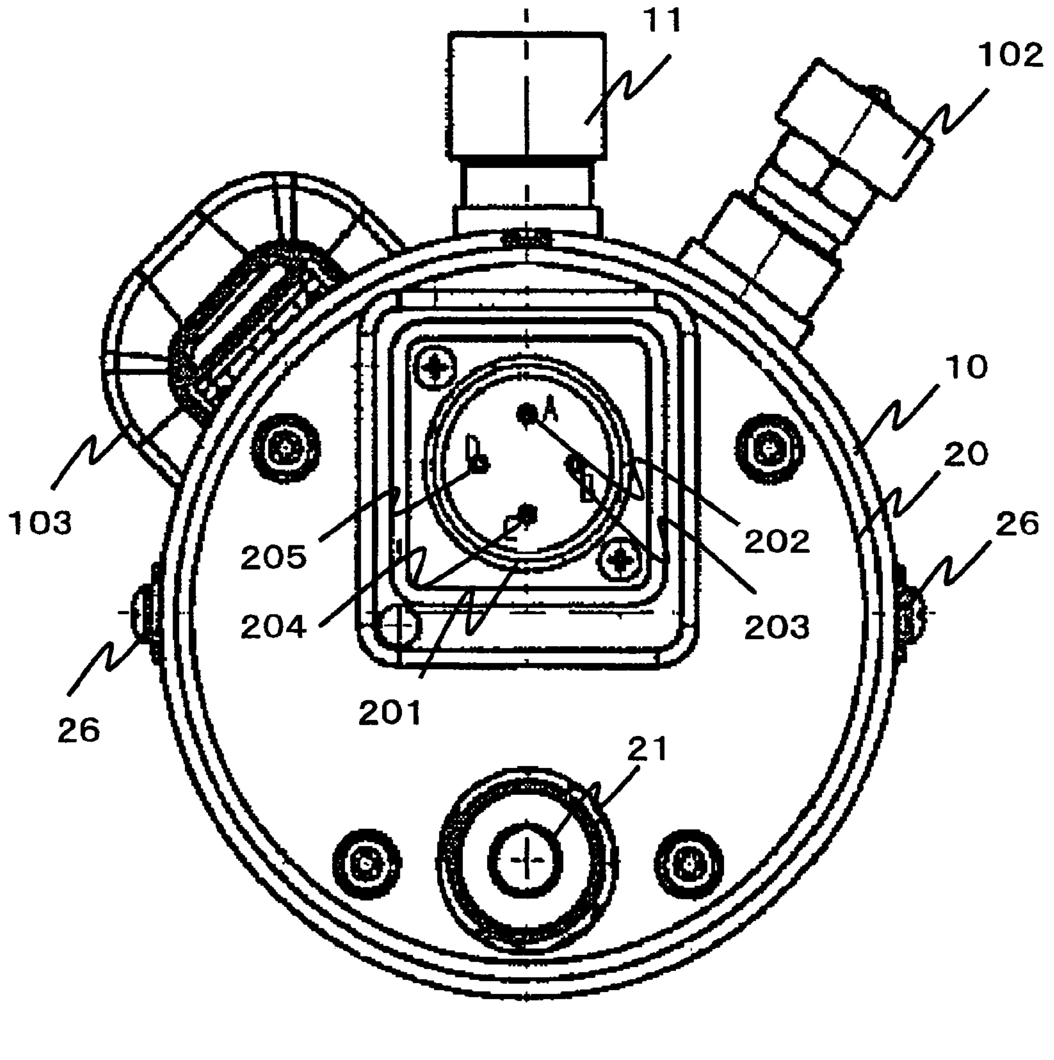
FIG. 3 is a bottom view illustrating the aircraft use water heater of the illustrative embodiment of the present invention.

FIG. 3 is a bottom view illustrating the aircraft use water heater of the illustrative embodiment of the present invention. In FIG. 3, the reference numeral 10 denotes a tank section, the reference numeral 11 denotes a water outlet, the reference numeral 20 denotes a controlling section, the reference numeral 21 denotes a water inlet, the reference numeral 26 denotes a connecting section, the reference numeral 102 denotes a release valve, the reference numeral 103 denotes a thermostat, the reference numeral 201 denotes a power source connector, the reference numeral 202 denotes an AC power source terminal, the reference numeral 203 denotes an AC neutral point terminal, the reference numeral 204 denotes a chassis ground terminal, and the reference numeral 205 denotes a fixed ground terminal.

The tank section 10 is connected to the controlling section 20 via the connecting section 26. Water flowing from the water inlet 21 at the bottom section of the controlling section 20 is heated in the tank section 10 and heated warm water is taken out through the water outlet 11 of the tank section 10.

The bottom section of the controlling section 20 has the power source connector 201. The AC power source terminal 202 and the AC neutral point terminal 203 of the power source connector 201 are connected to an aircraft power source of 115V and a variable frequency from 360 Hz to 800 Hz. The chassis ground terminal 204 and the fixed ground terminal 205 are connected to the tank section 10 and are grounded.

Figure 4:
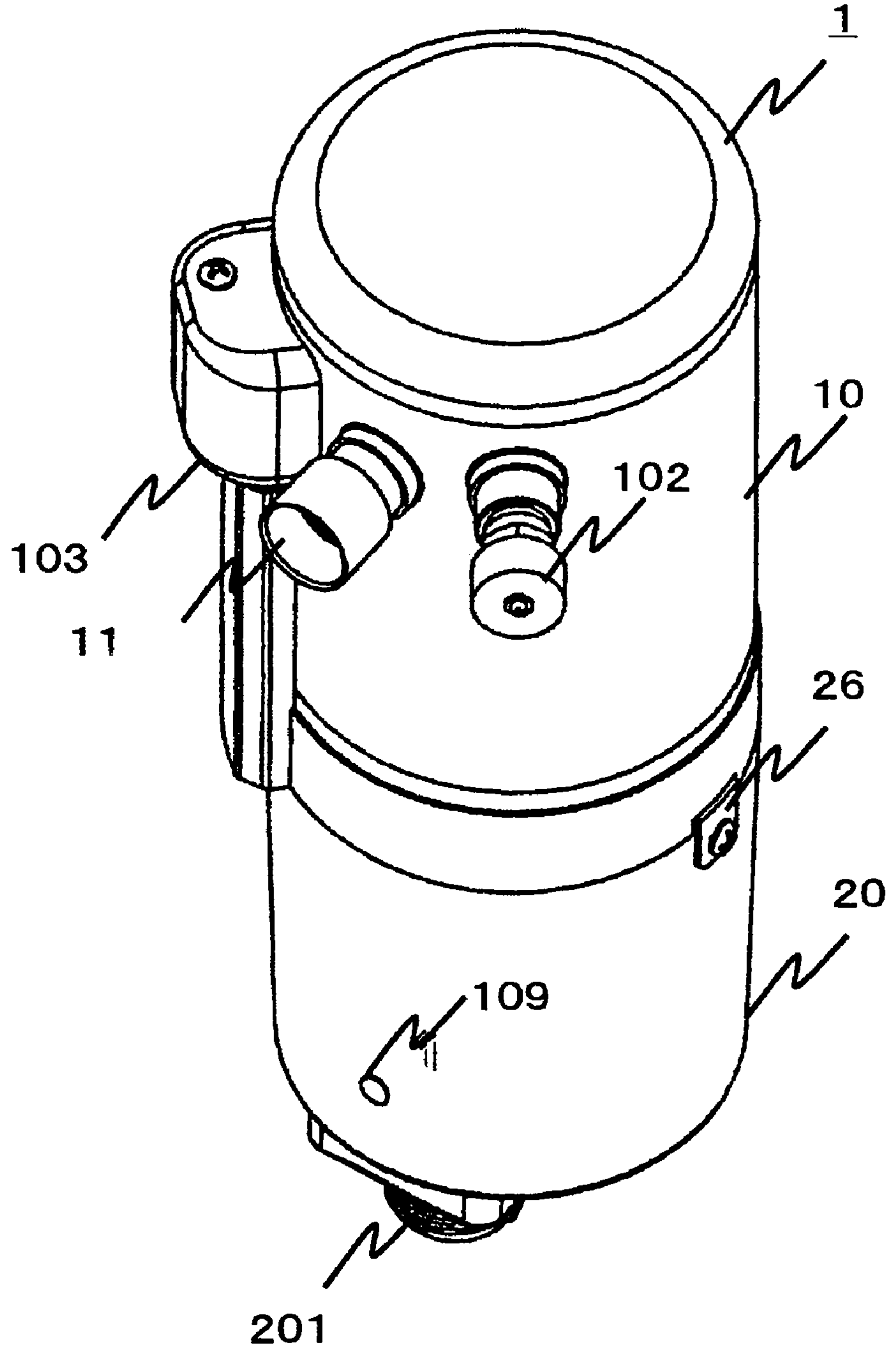
FIG. 4 is a perspective view illustrating the aircraft use water heater of the illustrative embodiment of the present invention.

FIG. 4 is a perspective view illustrating the aircraft use water heater of the illustrative embodiment of the present invention. In FIG. 4, the reference numeral 1 denotes a water heater, the reference numeral 10 denotes a tank section, the reference numeral 11 denotes a water outlet, the reference numeral 20 denotes a controlling section, the reference numeral 201 denotes a power source connector, the reference numeral 26 denotes a connecting section, the reference numeral 102 denotes a release valve, the reference numeral 103 denotes a thermostat, and the reference numeral 109 denotes a light-emitting diode indicator.

Figure 5:
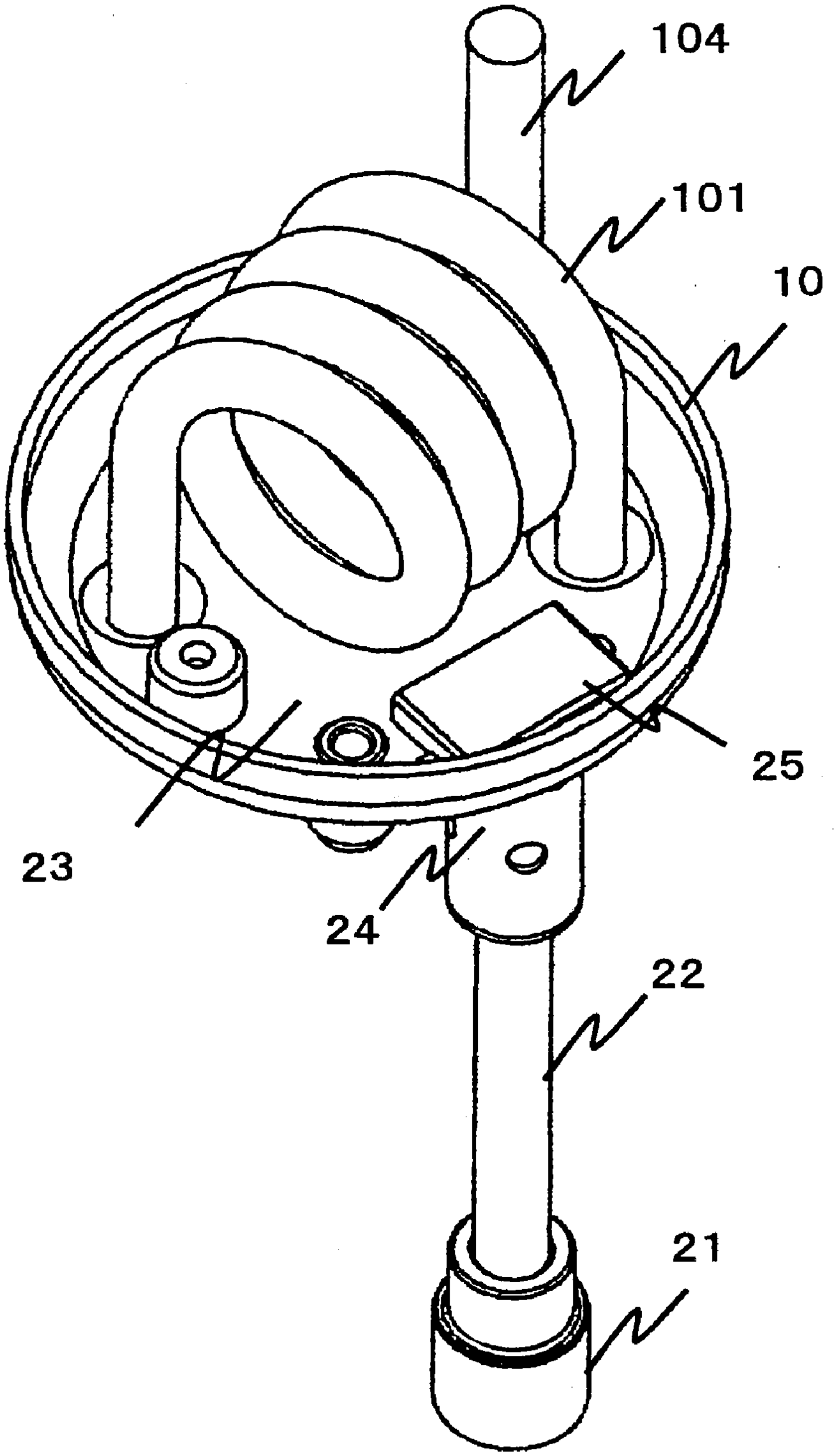
FIG. 5 is an exploded perspective view illustrating a tank section of the illustrative embodiment of the present invention.

FIG. 5 is an exploded perspective view illustrating the tank section of the aircraft use water heater of the illustrative embodiment of the present invention. In FIG. 5, the reference numeral 10 denotes a tank section, the reference numeral 21 denotes a water inlet, the reference numeral 22 denotes an inner pipe, the reference numeral 23 denotes a tank bottom face, the reference numeral 24 denotes an inflow inlet, the reference numeral 25 denotes a baffle plate, the reference numeral 101 denotes a helical coil heater, and the reference numeral 104 denotes a temperature fuse.

The bottom face 23 of the tank section 10 has the helical coil heater 101, the temperature fuse 104, and the baffle plate 25. The temperature fuse 104 is a safety apparatus that senses an overtemperature to prevent boil-dry.

The helical coil heater 101 uses a sheath tube made of austenite-base stainless NAR-AH-1 having superior high temperature corrosion resistance, oxidation resistance, and machinability to improve the durability. By having the coil-like shape to increase the surface area, the watt density is reduced. The helical coil heater 101 is provided so that the helical axis is in parallel with the bottom face 23 of the tank section 10.

The water inlet 21 provided at the lower part of the controlling section and the inflow inlet 24 provided in the tank bottom face 23 of the tank section 10 are connected to each other via an inner pipe extending so as to penetrate the interior of the controlling section. The water flowing in the water inlet 21 is sent through the inner pipe 22 and flows from the inflow inlet 24 of the tank bottom face 23 to the interior of the tank section 10.

The tank bottom face 23 is provided so that the baffle plate 25 covers the inflow inlet 24 of the tank bottom face 23. The water flowing from the inflow inlet 24 collides against the baffle plate 25 and then water flows in a different direction to flow along the tank bottom face 23 in the direction of the helical coil heater 101 and then is moved upwardly, while being heated, in the vicinity of the helical coil section of the helical coil heater 101.

Figure 6:
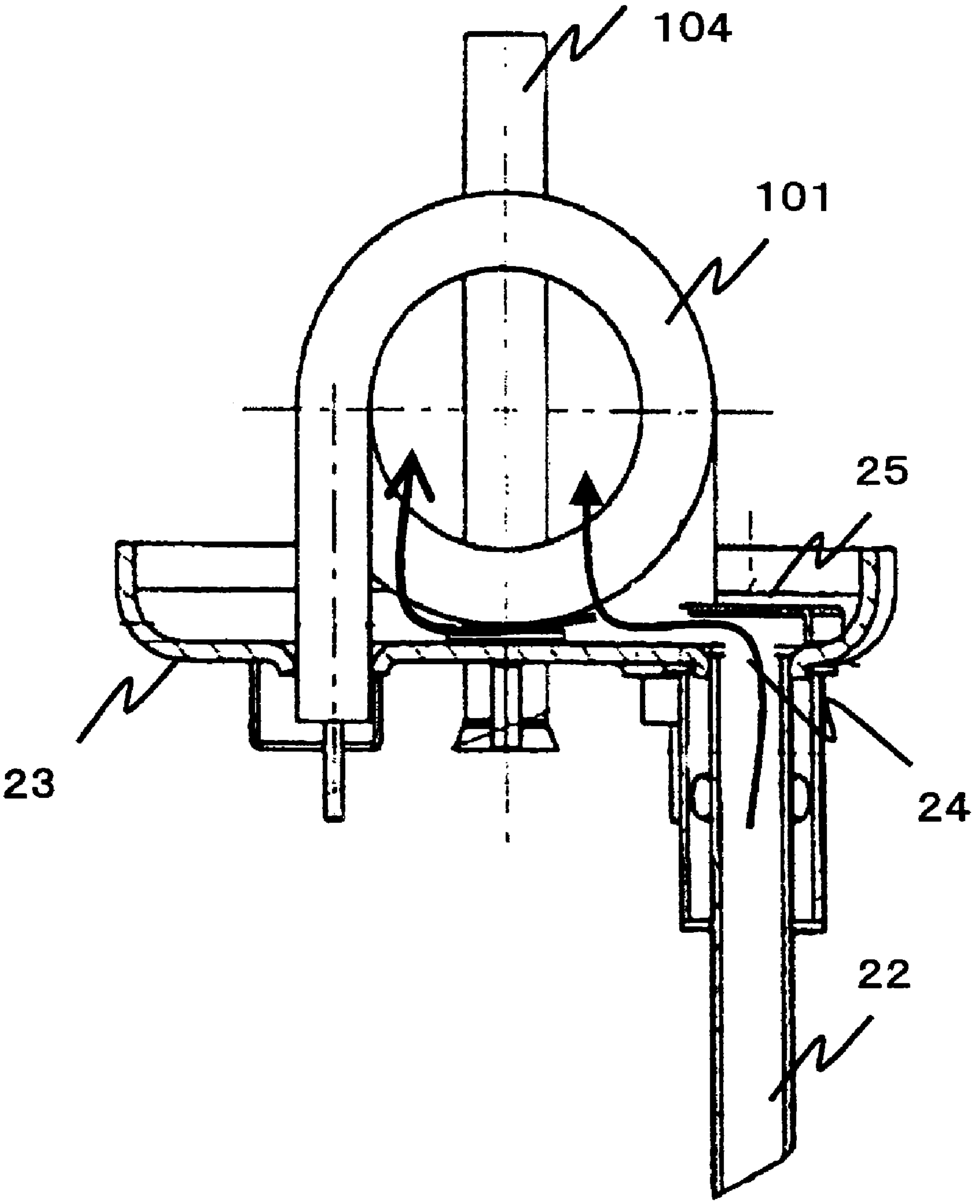
FIG. 6 is a cross-sectional view illustrating a tank section of the illustrative embodiment of the present invention.

FIG. 6 is a cross-sectional view illustrating the tank section of the aircraft use water heater of the illustrative embodiment of the present invention. In FIG. 6, the reference numeral 22 denotes an inner pipe, the reference numeral 23 denotes a tank bottom face, the reference numeral 24 denotes an inflow inlet, the reference numeral 25 denotes a baffle plate, the reference numeral 101 denotes a helical coil heater, and the reference numeral 104 denotes a temperature fuse.

The bottom face 23 of the tank section 10 has the helical coil heater 101, the temperature fuse 104, and the baffle plate 25. The temperature fuse 104 is a safety apparatus that senses an overtemperature to prevent boil-dry.

As shown by the two arrows in FIG. 6, water flowing from the inner pipe 22 through the inflow inlet 24 of the tank bottom face 23 into the tank section 10 collides against the baffle plate 25 and flows in a different direction to flow along the tank bottom face 23 in the direction of the helical coil heater 101 and then is moved upwardly, while being heated, in the vicinity of the helical coil section of the helical coil heater 101.

Figure 7:
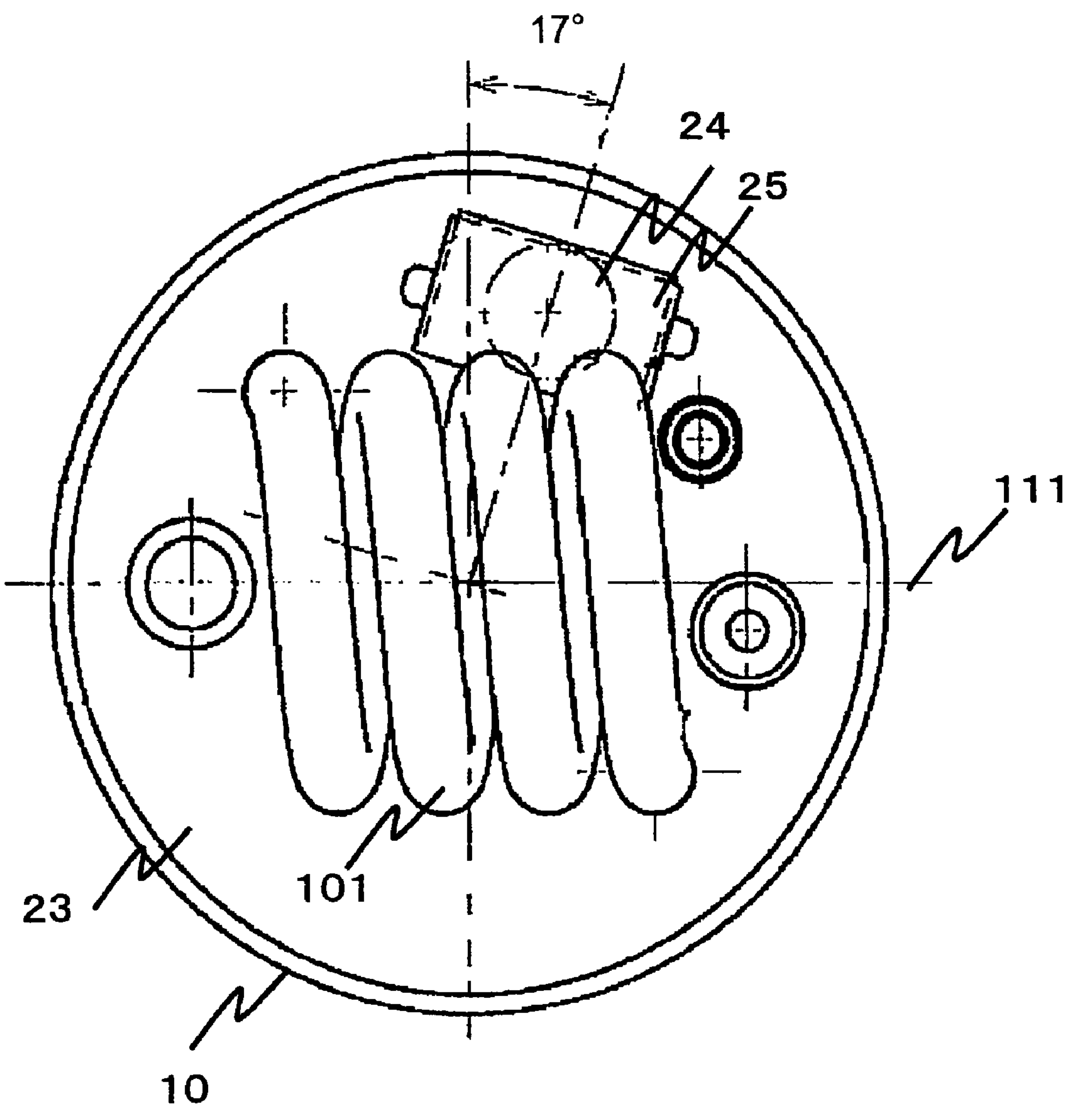
FIG. 7 is an exploded top view illustrating the tank section of the aircraft use water heater of the illustrative embodiment of the present invention.

FIG. 7 is an exploded top view illustrating the tank section of the aircraft use water heater of the illustrative embodiment of the present invention. In FIG. 7, the reference numeral 10 denotes a tank section, the reference numeral 23 denotes a tank bottom face, the reference numeral 24 denotes an inflow inlet, the reference numeral 25 denotes a baffle plate, the reference numeral 101 denotes a helical coil heater, and the reference numeral 111 denotes a helical axis.

The baffle plate 25 is provided in a direction dislocated by a predetermined angle (17 degrees in the drawing) from the direction along which the baffle plate 25 is orthogonal to the helical axis 111 of the helical coil heater 101. The water flowing from the baffle plate 25 moves along the tank bottom face 23 in the direction of the helical coil heater 101 and collides against the heated helical coil section of the helical coil heater 101 and is collected, without passing the helical coil heater 101, in the vicinity of the helical coil section and is moved upwardly, while being heated, in the vicinity of the helical coil section. Thus, water is heated efficiently and can be quickly heated with low power consumption.

Figure 8:
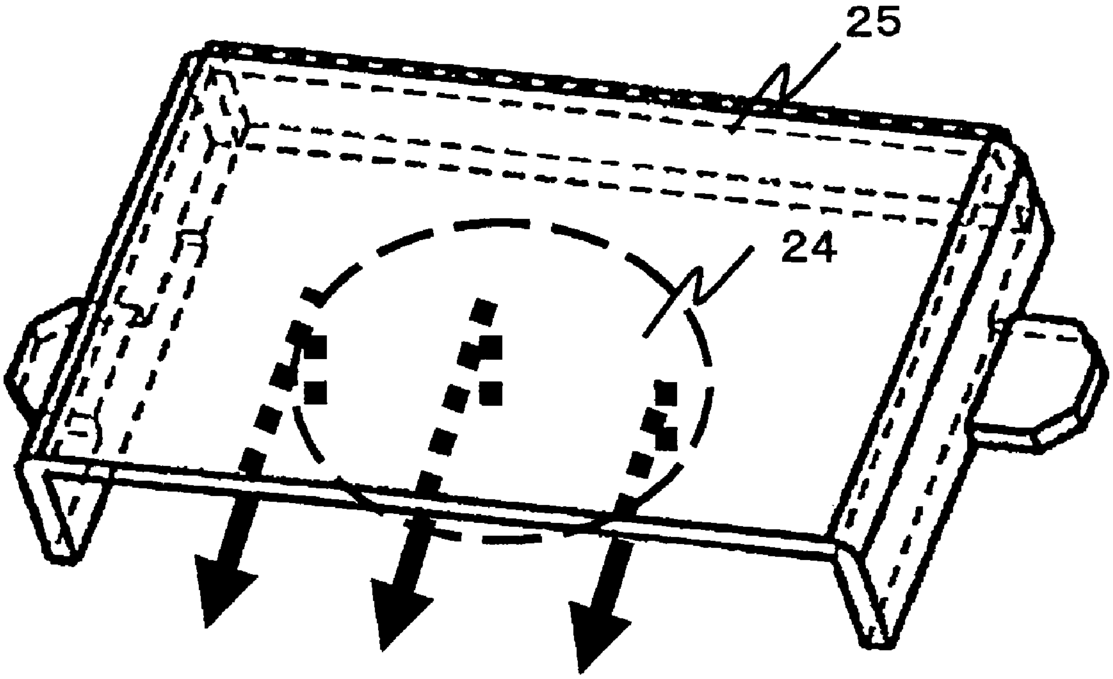
FIG. 8 is a perspective view illustrating a baffle plate provided in the tank section of the aircraft use water heater of the illustrative embodiment of the present invention.

FIG. 8 is a perspective view illustrating a baffle plate provided in the tank section of the aircraft use water heater of the illustrative embodiment of the present invention. In FIG. 8, the reference numeral 24 denotes an inflow inlet, the reference numeral 25 denotes a baffle plate, and the arrows show the flow of water.

The water flowing from the inflow inlet 24 into the tank section is caused to flow along the tank bottom face by the baffle plate 25 provided so as to cover the inflow inlet 24. The baffle plate 25 is composed of: an upper face plate against which water flowing from the inflow inlet 24 to the tank section collides; side face plates covering side faces other than that in the direction along which water flows out; and a connecting section for connecting the baffle plate 25 to the tank bottom face.

Figure 9:
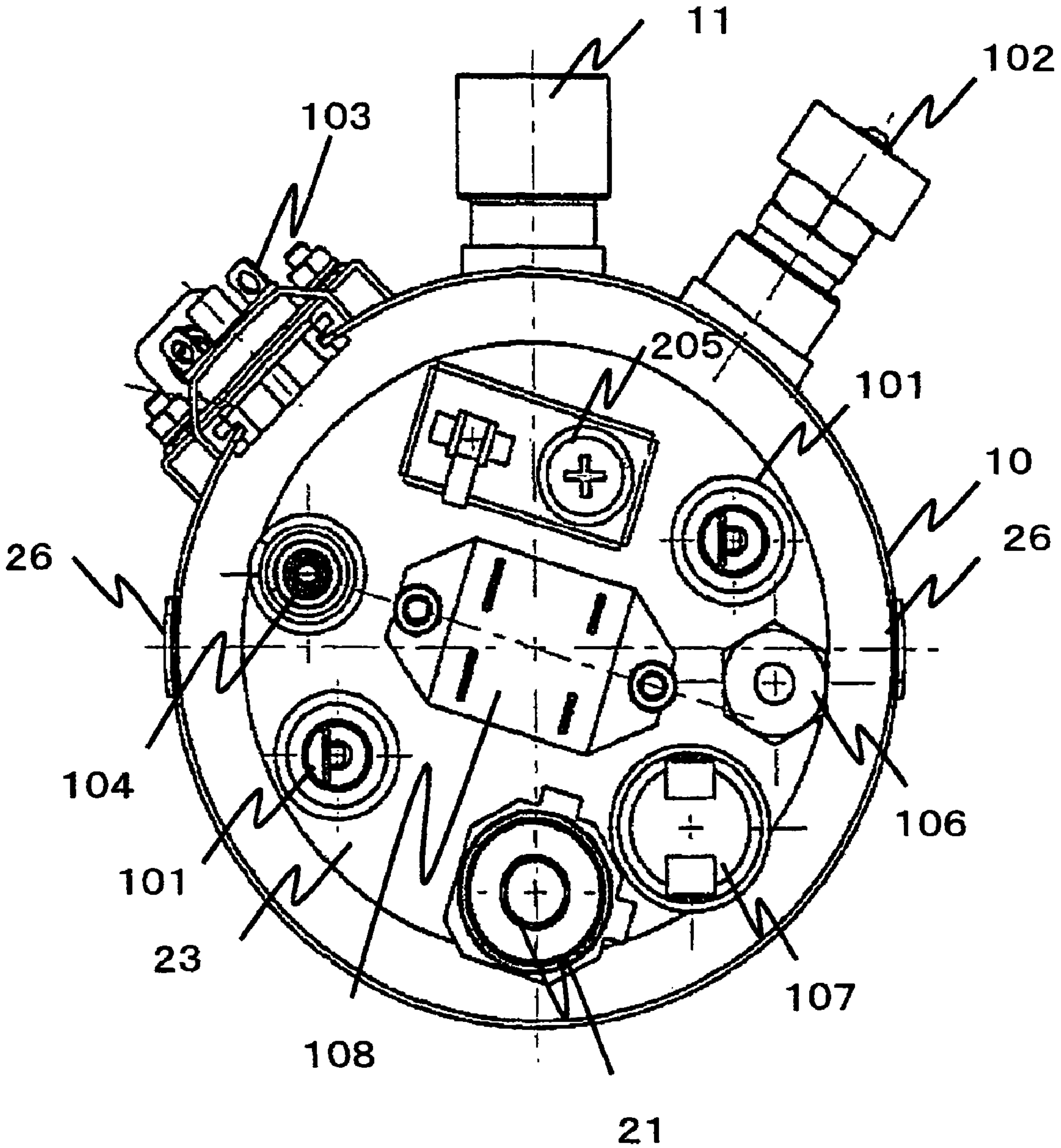
FIG. 9 is a layout diagram illustrating control elements of the tank bottom face of the aircraft use water heater of the illustrative embodiment of the present invention.

FIG. 9 is a layout diagram illustrating control elements of the tank bottom face of the aircraft use water heater of the illustrative embodiment of the present invention. In FIG. 9, the reference numeral 10 denotes a tank section, the reference numeral 11 denotes a water outlet, the reference numeral 21 denotes a water inlet, the reference numeral 23 denotes a tank bottom face, the reference numeral 26 denotes a connecting section, the reference numeral 101 denotes a helical coil heater, the reference numeral 102 denotes a release valve, the reference numeral 103 denotes a thermostat, the reference numeral 104 denotes a temperature fuse, the reference numeral 106 denotes a thermistor, the reference numeral 107 denotes a pressure sensor (switch), the reference numeral 108 denotes a solid state relay (SSR), and the reference numeral 205 denotes a bonding connecting section.

The center of the back face of the tank bottom face 23 has the SSR 108. Heat generated by the SSR 108 is transmitted through the tank bottom face 23 into the tank section 10 and the baffle plate 25 is used to efficiently heat the water flowing along the tank bottom face 23.

The release valve 102, the thermostat 103, the temperature fuse 104, the thermistor sensor 106, the pressure sensor (switch) 107 or the like are safety apparatuses that protect the operation of an aircraft use water heater. The release valve 102 senses a high pressure in the tank section 10. The pressure sensor (switch) 107 senses the water pressure in the tank section 10 to prevent boil-dry. The thermistor sensor 106 senses an overtemperature to prevent boil-dry. The thermostat 103 prevents an overtemperature and boil-dry. The temperature fuse 104 senses an overtemperature to prevent boil-dry. These safety apparatuses are provided at the back face of the bottom face of the tank section and are connected to a power source control substrate in the controlling section. This can consequently achieve the controlling section of the water heater having a smaller size.

Figure 10:
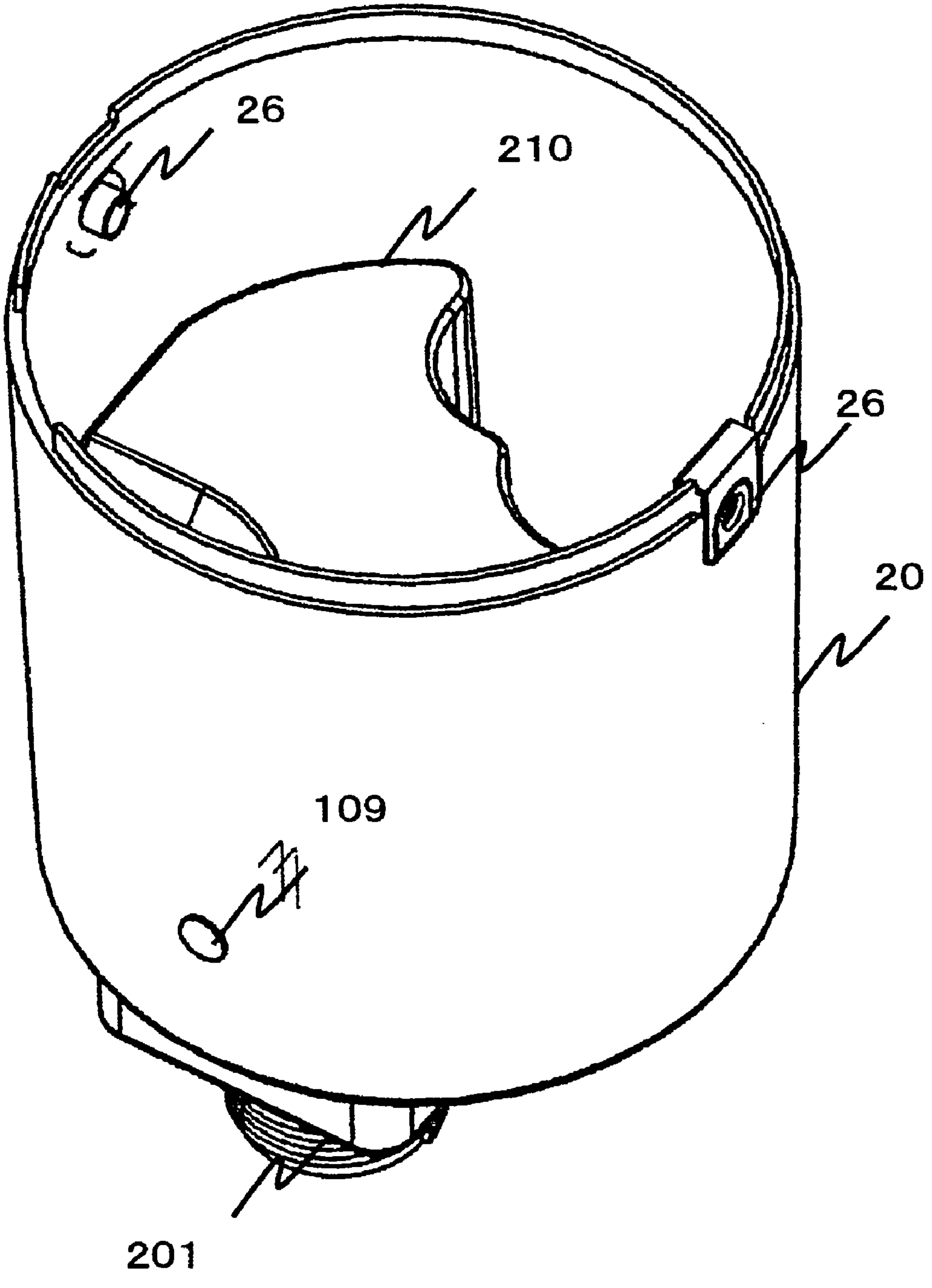
FIG. 10 is an exploded perspective view illustrating a controlling section of the aircraft use water heater of the illustrative embodiment of the present invention.

FIG. 10 is an exploded perspective view illustrating a controlling section of the aircraft use water heater of the illustrative embodiment of the present invention. In FIG. 10, the reference numeral 20 denotes a controlling section, the reference numeral 201 denotes a power source connector, the reference numeral 26 denotes a connecting section, the reference numeral 109 denotes a light-emitting diode indicator, and the reference numeral 210 denotes a control substrate cover.

The control substrate cover 210 covers the power source control substrate in the controlling section 20. When the tank section 10 is connected to the controlling section 20 via the connecting section 26, the upper space of the control substrate cover 210 of the controlling section 20 has the connecting parts to the respective safety apparatuses provided at the back face of the tank bottom face 23 of the tank section 10.

Figure 11:
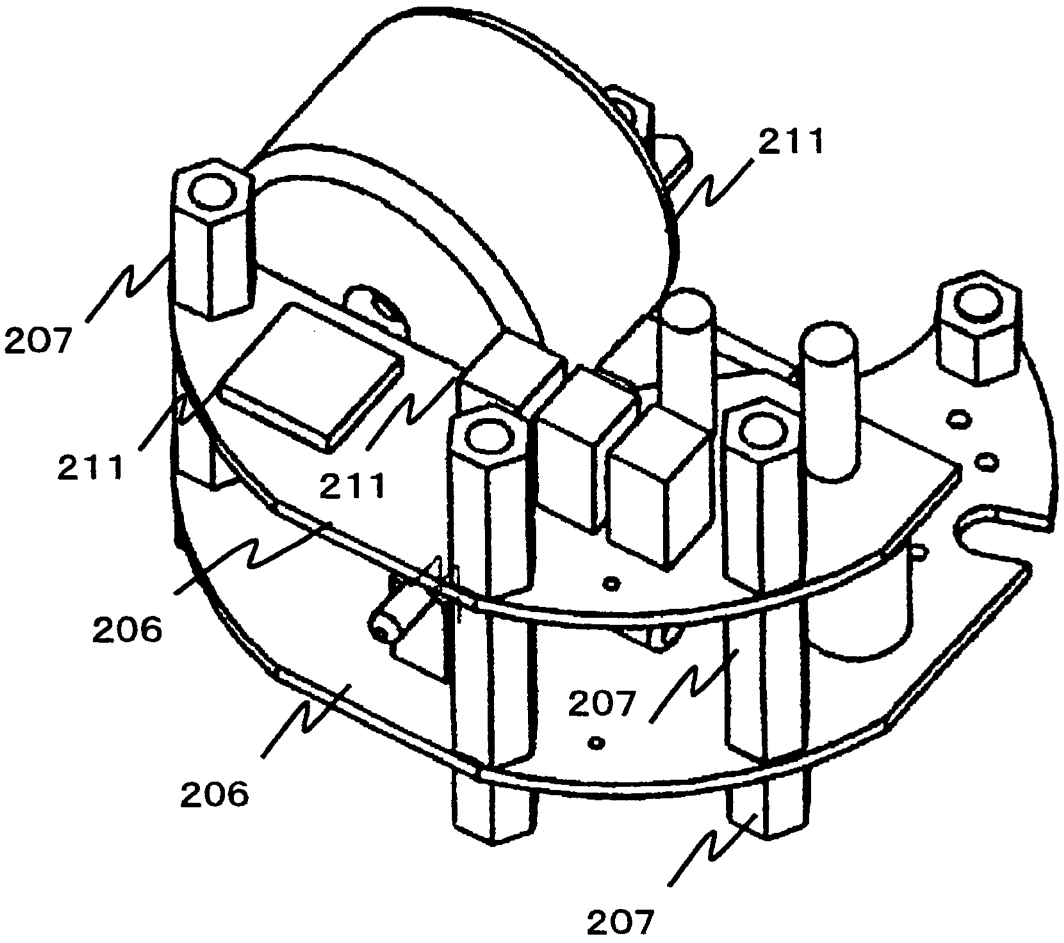
FIG. 11 is a perspective view illustrating a power source control substrate provided in a controlling section of the aircraft use water heater of the illustrative embodiment of the present invention.

FIG. 11 is a perspective view illustrating a power source control substrate provided in a controlling section of the aircraft use water heater of the illustrative embodiment of the present invention. In FIG. 11, the reference numeral 206 denotes a power source control substrate (PCB), the reference numeral 207 denotes a spacer, and the reference numeral 211 denotes a circuit element.

The power source control substrates 206 are provided at an interval therebetween by the spacers 207 and are connected to various circuit elements 211. In the controlling section 20, the power source control substrate 206 is provided at the lower part of the control substrate cover 210 and is connected to the respective safety apparatuses provided at the upper part of the control substrate cover 210.

Figure 12:
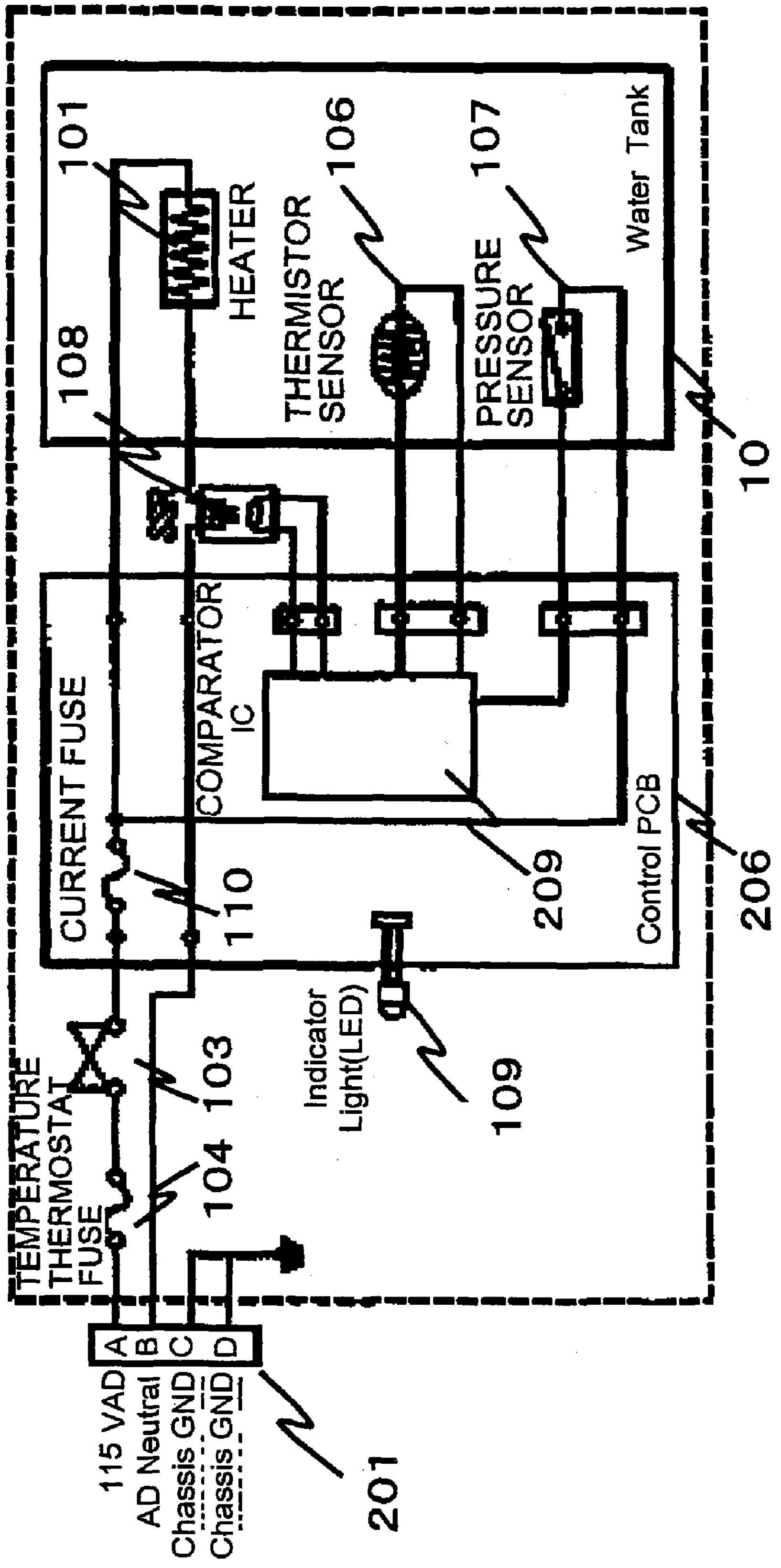
FIG. 12 is a connecting diagram of the aircraft use water heater of the illustrative embodiment of the present invention.

FIG. 12 is a connecting diagram of the aircraft use water heater of the illustrative embodiment of the present invention. In FIG. 12, the reference numeral 10 denotes a tank section, the reference numeral 101 denotes a helical coil heater, the reference numeral 103 denotes a thermostat, the reference numeral 104 denotes a temperature fuse, the reference numeral 106 denotes a thermistor sensor, the reference numeral 107 denotes a pressure sensor (switch), the reference numeral 108 denotes a SSR, the reference numeral 109 denotes a light-emitting diode indicator, the reference numeral 110 denotes a current fuse, the reference numeral 201 denotes a power source connector, the reference numeral 206 denotes a power source control substrate (PCB), and the reference numeral 209 denotes an IC comparator.

The power source connector 201 receives single-phase AC (nominal AC115V, 360 Hz to 800 Hz). By allowing the pressure sensor (switch) 107 to sense the water pressure in the tank to turn ON the SSR 108, power is supplied to the IC comparator 209. The thermistor sensor 106 and the IC comparator 209 are used to sense the temperature of the water in the tank and, when the water temperature is lower than the set value, the SSR 108 is turned ON to supply power to the helical coil heater 101 to start the heating. When the water temperature reaches the set value, the SSR 108 is turned OFF and the heating is stopped.

FIG. 13 is a table of performances and characteristics for the aircraft use water heater of the illustrative embodiment of the present invention. In FIG. 13, the dry weight in the case of the conventional example is 1.81 kg, the dry weight of the present invention is 1.18 kg, showing a 35%-reduction. The outer diameter of the conventional example is 102 mm and the outer diameter of the present invention is 90 mm. The height of the conventional example is 305 mm and the height of the present invention is 244 mm, showing a 45%-reduction.

Regarding a power source supply, while the conventional example only can handle a fixed frequency of 400 Hz, the present invention can handle variable frequencies from 360 Hz to 800 Hz. Regarding the power consumption and current consumption, while the conventional example requires 420 W and 3.61 A, the present invention requires 700 W and 6.1 A. By combining the high power consumption and current consumption of 700 W and 6.1 A with a set hot water temperature of 48 degrees C., the initial boiling time could be significantly improved from 9 minutes of the conventional example to 2 minutes and 15 seconds. By setting the continuous hot water discharge time to a small value, the recovery time was significantly improved from 1 minute and 50 seconds of the conventional example to 1 minute.

Figure 14:
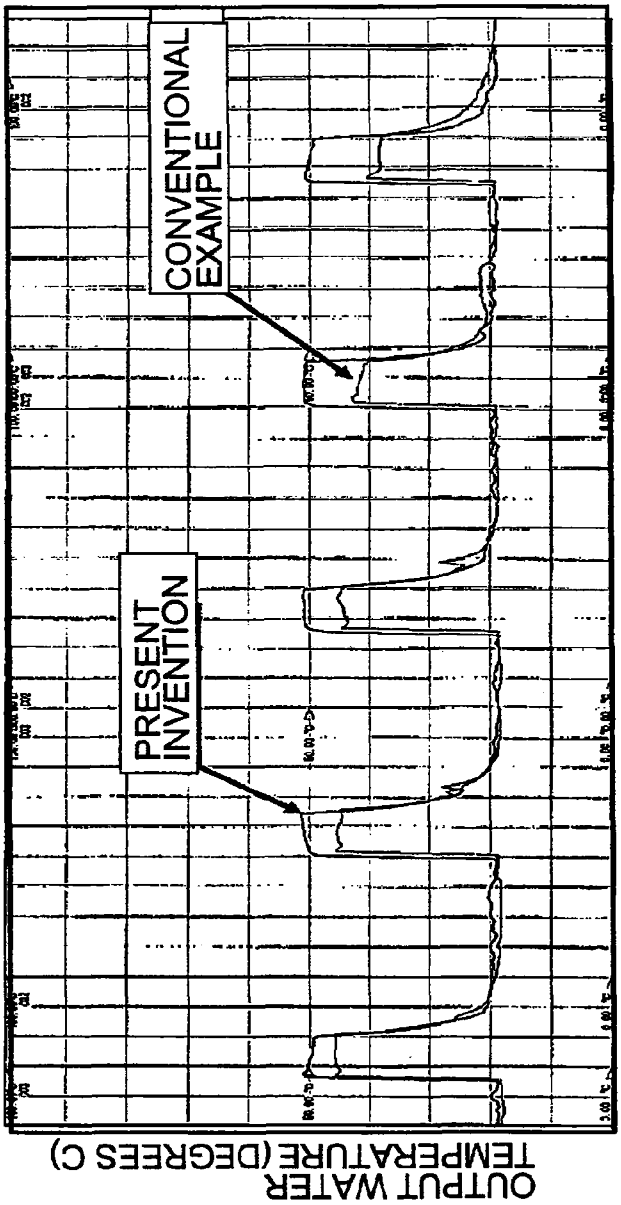
FIG. 14 is a reference diagram illustrating the hot water temperature characteristic obtained by the aircraft use water heater of the illustrative embodiment of the present invention.
Figure 15:
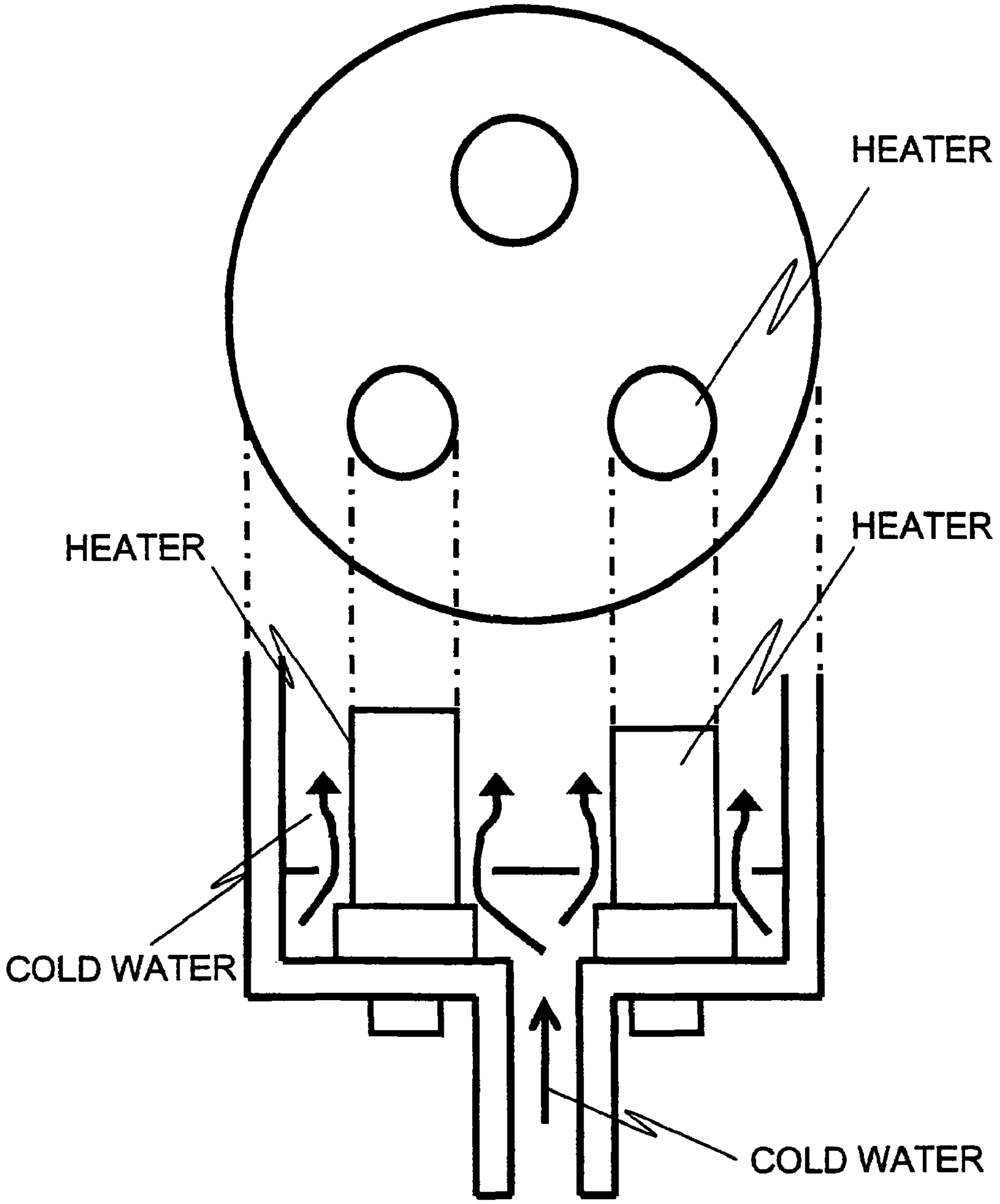
FIG. 15 is a schematic diagram illustrating the structure of an aircraft use water heater of a conventional example.

FIG. 14 is a reference diagram illustrating the hot water temperature characteristic repeatedly obtained by the aircraft use water heater of the illustrative embodiment of the present invention. FIG. 14 shows a change in the temperature characteristic when warm water is supplied 5 times for 15 seconds with an interval of 60 seconds.

In the case of the conventional aircraft use water heater, the first warm water is 46 degrees C. and the second warm water is 45 degrees C. but the fourth warm water is 40 degrees C. and the fifth warm water is 37 degrees C., showing a significant decline of the temperature of the water and causing cold water having a temperature around a body temperature to be discharged through the warm water outlet. The aircraft use water heater of the present invention on the other hand can provide the first warm water of 48 degrees C., the second warm water of 51 degrees C. and the fifth warm water of 49 degrees C., thus continuously supplying warm water of a high temperature.

The water heater of the present invention can be used as a hot-water supply apparatus in a lavatory of an aircraft and can be combined with a warm water mixer to supply warm water of various temperatures. Furthermore, the small and efficient structure of the water heater of the present invention also can be widely used in a wide range in addition to aircraft use devices.

What is claimed is:

1. An aircraft use water heater comprising a tank section for heating liquid stored therein and a controlling section for controlling the heating of the liquid by an aircraft power source, wherein the aircraft use water heater includes:

an inflow inlet formed in a bottom face of the tank section through which the liquid flows into the tank section;

a baffle plate that is provided at an upper part of the inflow inlet and that prevents the liquid from moving in a straight manner;

a helical coil-type heater in the tank section, the helical coil-type heater has a helical axis provided in a direction parallel to the bottom face of the tank section; and a liquid outlet formed in an upper part of a wall face of the tank section, liquid flowing from the inflow inlet to the tank section collides against the baffle plate to flow in a different direction parallel to the bottom face of the tank section and moves to the lower part of the helical coil-type heater and then is moved upwardly, while being heated, in the vicinity of a helical coil section of the helical coil-type heater and the heated liquid is caused to flow through the liquid outlet.

2. The aircraft use water heater according to claim 1, wherein the baffle plate is provided in a direction dislocated by a predetermined angle from a direction along which the baffle plate is orthogonal to a helical axis of the helical coil-type heater, liquid flowing from the baffle plate in a direction parallel to the bottom face collides against a helical coil section at a lower part of the helical coil-type heater to flow in a different direction and is moved upwardly, while being heated, in the vicinity of the helical coil section.

3. The aircraft use water heater according to claim 2, wherein the bottom face of the controlling section has an aircraft power source connector and a liquid inlet, the aircraft power source connector is connected to a power source control substrate in the controlling section, the liquid inlet of the bottom face of the controlling section is connected to the inflow inlet of the bottom face of the tank section via an inner pipe penetrating an interior of the controlling section.

4. The aircraft use water heater according to claim 3, wherein a radiating control element connected to the power source control substrate of the controlling section is provided at a back face of the bottom face of the tank section, the tank bottom face is used as a heat sink, and heat generated from the radiating control element is used to heat the liquid via the bottom face of the tank section.

5. The aircraft use water heater according to claim 4, wherein a pressure sensor, a thermistor sensor, and a temperature fuse as a safety apparatus are provided in the tank section and are connected to the power source control substrate in the controlling section via a connecting section provided at a back face of the bottom face of the tank section.

6. The aircraft use water heater according to claim 5, wherein a side face of the tank section has, as a safety apparatus, a release valve, a thermostat, and a light-emitting diode indicator indicating ON or OFF of a power source.

* * * * *